United States Patent Office 3,469,168
Patented Sept. 23, 1969

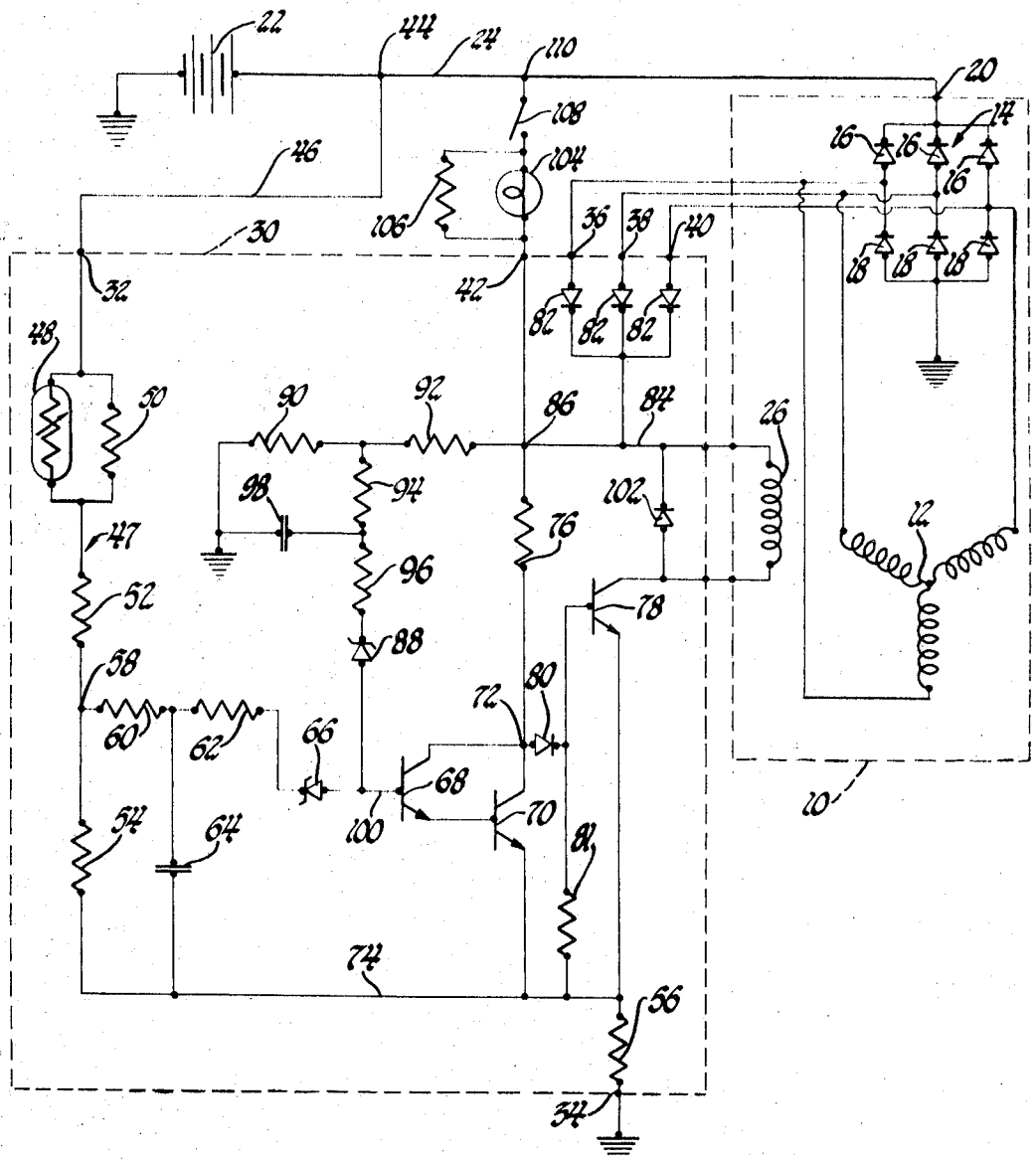

3,469,168
VOLTAGE PROTECTION CIRCUIT FOR
TRANSISTOR REGULATORS
Glen E. Harland, Jr., and Charles G. Hanson, Kokomo, Ind., assignors to General Motors Corporation, Detroit, Mich., a corporation of Delaware
Filed Sept. 19, 1967, Ser. No. 668,836
Int. Cl. H02j 7/10
U.S. Cl. 320—64                                        7 Claims

ABSTRACT OF THE DISCLOSURE

This invention relates to a transistor regulator for controlling the output voltage of a battery charging generator. The transistor regulator includes a first voltage sensing circuit for sensing the output voltage of the generator and includes a regulating section controlled by the sensing circuit for regulating the field current of the generator. The field power for the generator is supplied by a circuit that is separate from the circuit that supplies current to the battery and the first voltage sensing circuit of the regulator. If the voltage sensing circuit becomes disconnected from the battery or if the generator becomes disconnected from the battery the regulator will sense either no voltage or battery voltage causing field power to be continuously supplied. This raises the output voltage of the generator to a point where the regulator will be destroyed. To prevent this a second voltage sensing circuit is provided which is connected with the circuit for supplying field power to the generator. The second voltage sensing circuit is capable of regulating the output voltage of the generator even when the first voltage sensing circuit is disconnected from the system or otherwise is sensing a low voltage.

---

This invention relates to a voltage protection circuit for voltage regulators which are preferably of the transistor type and relates to a system which is capable of regulating the output voltage of a battery charging generator even when the generator and battery become disconnected and under conditions where the normal voltage sensing circuit of the voltage regulator becomes disconnected from the generator and battery.

It is desirable, in regulating systems for diode-rectified alternators that are used for battery charging to provide some means of disconnecting the field circuit of the generator from the battery when the system is not in use to prevent the battery from discharging through the field of the alternator. In the past this has been done in some systems by field relays which respond to the output voltage of the alternator. Where it is desired to eliminate relay contacts from the system the field power can be supplied by a plurality of auxiliary diodes which are in addition to the main rectifier bridge. The auxiliary diodes together with some of the main bridge diodes can be used to supply field power and the voltage sensing part of the voltage regulator. It has been found, however, that where both the regulator sense voltage and field power are supplied by the auxiliary diodes and a part of the rectifier bridge the voltage sensed is not an accurate representation of the output voltage of the generator because of the difference in voltage drop across the auxiliary diodes and across the diodes of the main rectifier bridge that supplies battery charging current and the other electrical loads on a motor vehicle.

In order to provide a means for disconnecting the field circuit of the generator when the generator is not operating and still provide accurate voltage regulation the voltage sensing circuit of the regulator can be permanently connected across the battery and therefore across the output terminals of the main bridge rectifier and a separate field circuit is then provided including the auxiliary diodes which now only serve to supply field current.

It has been found that by separating the voltage sensing section of the system and the field supply system as described above certain problems can be encountered should the main rectifier bridge become disconnected from the battery or should the voltage regulator become disconnected from the battery and rectifier bridge. In the case of a disconnection of the voltage sensing circuit the regulator senses no voltage and when the battery and main bridge rectifier become disconnected the regulator senses only battery voltage. In either case the regulator tends to maintain the field circuit of the generator "on" at all times. Since the field circuit is now on and since it is supplied by the generator through the auxiliary diodes it is possible for the generator to develop an abnormally high voltage which will destroy the voltage regulator and diodes.

In order to protect the split voltage sensing and field power voltage regulator system of this inventiton a second voltage sensing circuit is provided which is capable of sensing the voltage supplied by the auxiliary diodes. This second voltage sensing circuit is set to operate at a higher generator output voltage than the normal first voltage sensing circuit provides and when the abnormal high voltage occurs the second voltage sensing circuit will operate to maintain the output voltage of the generator at a value which will not destroy components of the system.

It accordingly is one of the objects of this invention to provide a high voltage protection system for a generator-voltage regulating system of the type that includes separate circuits fed by the generator for respectively applying a sense voltage to the regulator and field power to the field winding.

Another object of this invention is to provide a voltage protection system for a regulating system where a voltage sensing circuit is provided which is in addition to the normal voltage sensing circuit and which is connected to the field circuit of the generator.

Another object of this invention is to provide a generator-regulating system for a battery charging system where the battery and load current are provided by a three phase full-wave bridge rectifier circuit and where a first voltage sensing circuit of the regulator is connected across the battery and across the output terminals of the bridge rectifier and further where field power is supplied by three diodes which, together with the three diodes of the bridge rectifier, supply field power to the generator and where this system includes a second voltage sensing circuit connected with the three diodes for regulating the output voltage of the generator in the event that the first, or normal, voltage sensing circuit is for some reason sensing an abnormally low voltage or no voltage.

The single figure drawing is a schematic circuit diagram of a voltage regulating system made in accordance with this invention which includes the voltage protection system of this invention.

Referring now to the drawing, the reference numeral 10 generally designates a direct current power source which takes the form of a diode-rectified alternating current generator which is used to supply battery charging current on a motor vehicle and is used to supply other electrical loads on a motor vehicle when the generator is driven by the engine of the vehicle. The power source 10 includes an alternating current generator having a three phase Y-connected output winding 12 which is connected with the A.C. input terminals of a three phase full-wave bridge rectifier 14 comprised of positive diodes 16 and negative diodes 18. The cathodes of positive diodes 16 are connected with a direct current power output terminal 20.

The anodes of diodes 18 are connected directly to ground and with this arrangement the voltage developed between output terminal 20 and ground is utilized to charge the battery 22 of the electrical system via cable 24. Other electrical loads on the vehicle which are not shown are also supplied with current between cable 24 and ground.

The generator has a field winding 26 which controls the output voltage of the generator. As current through the field winding 26 is increased the output voltage of the generator increases and when this current is reduced the output voltage of the generator decreases. The regulating system to be described controls the field current to maintain a substantially constant output voltage from the power source 10.

The voltage regulator for the system is generally designated by the reference numeral 30 and is preferably of the transistor type. This voltage regulator has a voltage sensing terminal 32, a ground terminal 34 and terminals 36, 38 and 40 which are connected respectively with the phase windings of the generator output winding 12 and with the A.C. input terminals of the bridge rectifier 14. The regulator further includes a terminal 42 which is utilized to initially energize the field of the generator and which also provides a part of a system for indicating whether or not the power source 10 is operating properly, all of which is more fully described hereinafter.

The voltage sensing terminal 32 of the voltage regulato 30 is connected with a junction 44 by conductor 46. A first voltage sensing circuit generally designated by reference numeral 47 is connected between terminal 32 and ground and therefore responds to the potential appearing between junction 44 and ground. This voltage sensing circuit is a voltage divider comprised of parallel connected thermistor 48 and resistor 50 and resistors 52 and 54. This first voltage sensing network is in series with a small resistor 56 and it is pointed out that the voltage sensing circuit is permanently connected between junction 44 and ground and as will be more fully described hereinafter is separate from the circuit for supplying power to the field winding 26. This voltage sensing circuit is of relatively high resistance and there therefore is little or no leakage current through the voltage divider from the battery 22 even though it provides a permanent discharge path for the battery.

The junction 58 of the voltage sensing circuit is connected with resistors 60 and 62 and with a capacitor 64. The resistor 62 is connected in series with a Zener diode 66 which is connected with the base of NPN transistor 68. The emitter of transistor 68 is connected with the base of another NPN transistor 70 and the collectors of these two transistors are connected to junction 72. The emitter of transistor 70 is connected with conductor 74 while junction 72 is connected with resistor 76.

The junction 72 is connected with the base of another NPN transistor 78 through a diode 80. The transistor 78 is the device for controlling field current in the field winding 26 and this transistor 78 switches "on" and "off" to control field current. A resistor 81 is connected across the base and emitter of output transistor 78.

It has been pointed out previously that the regulator of this invention has separate circuits for supplying the sense voltage to the regulator and the field power. The field power is supplied by diodes 82 which have their anodes connected with the phase windings of the generator and which have their cathodes commonly connected to a conductor 84 which is connected with a junction 86. The field circuit for the field winding 26 can therefore be traced from output winding 12, through diodes 82, through conductor 84, through field winding 26, through the collector-emitter circuit of transistor 78, through resistor 56 to ground, and then through diodes 18 to the output winding 12. The conductor 84 and ground can be considered direct current field circuit supply terminals.

It is pointed out that the diodes 82 do not supply voltage to the voltage sensing circuit 47. The reason for this is that the diodes 16 and 18 supply relatively high current to the electrical loads on the vehicle including the battery and if the diodes 82, together with the diodes 18, were used to supply both field power and the voltage to the voltage sensing circuit of the regulator there would be an inaccurate representation of the actual output voltage because of the differences in the voltage drop across the diodes of the bridge rectifier 14 which handle high current and the diodes 82 which handle relatively lower current.

In the system, as thus far described, the voltage between junction 58 and ground is a part of the voltage appearing between junction 44 and ground and this voltage is a function of the output voltage of power source 10. When this voltage exceeds the desired regulated value, for example somewhat over 14 volts in a 12 volt system, the Zener diode 66 will break down and conduct supplying base current to transistors 68 and 70 which turns these transistors "on." With transistors 70 "on" the voltage of junction 72 will drop to therefore bias the transistor 78 nonconductive which turns "off" field current. As the output voltage of the power source 10 now decreases the voltage applied to Zener diode 66 reduces and this Zener diode will then cease conduction. When Zener diode 66 ceases to conduct transistors 68 and 70 turn "off" which causes the potential of junction 72 to rise and therefore bias transistors 78 "on." This completes a circuit for field winding 26 to increase field current and therefore increase the output voltage of the generator. The transistor 78 switches "on" and "off" continuously to maintain a substantially constant output voltage for the power source 10 at the desired regulated value for battery charging.

The regulating system that has just been described will operate properly as long as the voltage sensing circuit 46 is sensing the normal output voltage of the power source 10. It can be seen, however, that if for some reason the voltage sensing circuit does not respond to the output voltage of the generator 10 the system would bias transistor 78 continuously "on" and field power would then be continuously supplied through diodes 82 causing a high destructive voltage which could destroy the voltage regulator and the diodes 82.

One condition where the regulator will not respond to turn off transistor 78 is a condition where the cable 24 becomes, for some reason, disconnected from power output terminal 20. If this should ocucr the voltage sensing circuit now only senses the battery voltage and since the regulator is set to respond to an output voltage of the generator which is higher than battery voltage in order to charge the battery the regulator would be continuously sensing too low a voltage and by not responding to the output voltage of the generator 10 would go out of control.

Another situation where the regulator does not respond to turn off transistor 78 can occur if the junction 32 becomes disconnected from conductor 46 or putting it another way, where junction 32 becomes disconnected from junction 44. If this happens the voltage sensing circuit 47 has no voltage applied to it and the regulating system turns transistor 78 full "on." Since the diodes 82 are provided for supplying the field 26 the output voltage of the generator again could rise to such a value as to destroy the regulator.

In order to protect the regulating system against destruction from the conditions mentioned above a second voltage sensing circuit is provided which senses the voltage appearing between junction 86 and ground. This voltage is the output voltage of diodes 82 and 18 and is the voltage which is used to supply the field winding 26. This second voltage sensing circuit is comprised of Zener diode 88, resistors 90, 92, 94 and 96 and capacitor 98. The Zener diode 88 is connected between conductor 100 and resistor 96 and one end of resistor 90 is grounded as shown.

It can be seen that the conductor 100 provides a common connection for Zener diodes 66 and 88 and is connected with the base of transistor 68.

In the event of a high voltage condition of the type previously described where the output voltage of the generator rises above the desired regulated value to be maintained by voltage sensing circuit 47 the voltage between junction 86 and ground will be of a value that will cause the Zener diode 88 to break down. When Zener diode 88 breaks down it forward biases transistors 68 and 70 causing transistor 78 to turn "off." As the voltage of the power source 10 now reduces Zener diode 88 returns to a blocking state to therefore turn "on" transistor 78 and therefore supply field current to field winding 26. The transistor 78 now switches "on" and "off" under the control of Zener diode 88 to maintain an output voltage of the generator which is slightly higher than the desired regulated value.

The Zener diode 88 controls transistors 68, 70 and 78 in the same manner that these transistors are controlled by Zener diode 66 with the exception that the circuit is designed such that Zener diode 88 will only break down at an output voltage of the power source 10 which is somewhat higher than the desired regulated voltage that is maintained by Zener diode 66.

It can be seen from the foregoing that the regulating system of this invention includes two voltage sensing circuits, one of which maintains the normal desired output voltage for the power source 10 and the other of which comes into operation only when the normal voltage sensing circuit no longer responds to the output voltage of power source 10. The second voltage sensing circuit will maintain the output voltage of the generator at a value that is slightly higher than the desired regulated value that under normal conditions is maintained by the first voltage sensing circuit.

The resistors 94 and 96 and capacitor 98 provide electrical filtering for the system and circuit stability. The resistors 60 and 62 and the capacitor 64 perform the same function for Zener diode 66.

The diode 102 is a field discharge diode which forms a current path for field winding 26 when transistors 78 turns "off."

The electrical system includes an indicator lamp 104 which is connected in parallel with a resistor 106. These circuit elements are connected in series with an ignition switch 108 and terminal 42. One side of the ignition switch is connected with junction 110 which is connected to the positive side of battery 22.

When initially starting the engine of the vehicle the switch 108 is closed and the field winding 26 is initially energized from battery 22 via the parallel connected signal lamp 104 and resistor 106 through junction 42, through conductor 84, through field winding 26, through transistors 78 and then through resistor 56 to ground. This initially energizes the field winding 26 from the battery and the signal lamp 104 becomes lighted. When the generator comes up to voltage as when it is driven by the engine of the vehicle the potential on opposite sides of the signal lamp 104 become substantially equal due to the provision of diodes 82 which turns off the signal lamp 104. In the event of some failure in the system which lowers the voltage of junction 84 the signal lamp will light to indicate the malfunction.

It will, of course, be appreciated that during the initial energization of the field winding 26 the transistor 78 is biased "on" by the permanent connection of the voltage divider 47 across the battery.

Although a transistor regulator has been illustrated for regulating the output voltage of the generator it will be appreciated by those skilled in the art that the voltage protection system of this invention will be useful where other types of voltage regulators are used.

When the ignition switch 108 is open the only discharge path for the battery is through the voltage divider circuit 47. Thus, when the system is shut down the diodes 16 and 18, which are silicon diodes, prevent the battery from discharging through the polyphase output winding 12 and there is no discharge path through the field winding 26 since this field power is supplied by diodes 82 and 18.

Although the regulator and voltage protection circuit can be formed by wiring together discrete semiconductor components it is preferred that these components be formed as an integrated circuit as disclosed in copending application S.N. 668,794 filed Sept. 19, 1967.

If proper connections are maintained in the electrical system the first voltage sensing circuit including Zener diode 66 will have exclusive control of the system and the second voltage sensing circuit including Zener diode 88 will not come into play. During the high voltage condition the second voltage sensing circuit including Zener diode 88 will control the output voltage of the generator.

What is claimed is:

1. In an electrical system comprising, an alternating current generator having an output winding and a field winding, rectifier means having direct current output terminals connected with said output winding, conductor means connected with said direct current output terminals for supplying the electrical loads on said vehicle, a battery connected across said conductor means, a voltage regulator including a field control means and a first voltage responsive control means coupled to and controlling said field control means, means connecting said first voltage responsive control means across said conductor means, means coupled to said output winding providing a pair of direct current field energizing terminals at least one of which is separate from the direct current output terminals of said rectifier means, means connecting said field winding and said field control means across said direct current field energizing terminals, said first voltage responsive control means operating said field control means to reduce field current when the voltage across said conductor means is above a desired regulated value and operative to increase field current when said voltage is below said desired regulated value, said desired regulated value being higher than battery terminal voltage, and a second voltage responsive control means coupled to and controlling said field control means, means connecting said second voltage responsive control means across said direct current field energizing terminals, said second voltage responsive control means operating said field control means to reduce field current when the voltage across said conductor means reaches a high value which exceeds said desired regulated value and operative to increase field current when said voltage is below said high value but above said desired regulated value.

2. An electrical system comprising, a source of direct current having positive and negative output terminals and including a generator having an output winding and a field winding, voltage regulating means including a field control device and first and second voltage responsive control devices connected with said field control device controlling the operation of said field control device, a battery connected with said source of direct current, conductor means connecting said first voltage responsive control device across said battery whereby said first voltage responsive control device responds to the voltage applied to said battery from said power source, a field energizing circuit coupled to said generator and separate from said first voltage responsive control device connected with said field winding and with said field control device whereby field current is controlled by said field control device and is supplied by said generator through said field energizing circuit, and means connecting said second voltage responsive control device with said field energizing circuit whereby said second voltage control means responds to the voltage applied to said field energizing circuit and controls the output voltage of said generator in the event that the voltage applied to said first voltage control device is insufficient to operate said first voltage control device.

3. An electrical system comprising, an alternating current generator having a polyphase output winding and a field winding, first rectifier means connected with said output winding having direct current output terminals, a battery, means connecting said battery across said output terminals of said first rectifier means whereby said first rectifier means supplies charging current to said battery, a voltage regulating means including field control means and first and second voltage responsive control means connected with said field control means for controlling the operation of said field control means, a voltage sensing circuit connecting said first voltage control means across said battery and across said first rectifier means, a field energizing circuit connected with said output winding and separate from said voltage sensing circuit for supplying field current to said field winding and including second rectifier means, said field energizing circuit including in a series connection said second rectifier means, said field winding and said field control means, and means connecting said second voltage control means with said second rectifier means, said second voltage control means responding to an output voltage of said generator that is higher than the output voltage which operates said first voltage control means whereby said second voltage responsive control means regulates the output voltage of said generator in the event that the voltage applied to said first voltage control means is insufficient to operate said first voltage control means.

4. An electrical system comprising, a source of direct current including a generator having an output winding and a field winding, a voltage regulating means including a transistor having emitter, collector and base electrodes, a first voltage responsive sensing circuit including a first Zener diode coupled to the base of said transistor, a second voltage responsive sensing circuit including a second Zener diode coupled to the base of said transistor, a field energizing circuit for energizing the field of said generator connected with said output winding of said generator, said field energizing circuit including in a series connection said field winding and the collector and emitter electrodes of said transistor, a circuit separate from said field energizing circuit connecting said first sensing circuit with said generator whereby said first voltage responsive sensing circuit operates to maintain the output voltage of said generator at a desired regulated value, and means connecting said second voltage responsive sensing circuit with said field energizing circuit, said second voltage responsive sensing circuit operative to regulate the output voltage of said generator when said output voltage exceeds said desired regulated voltage by a predetermined amount.

5. An electrical system comprising, a polyphase alternating current generator having a field winding and a three-phase output winding, a three-phase full-wave bridge rectifier network having direct current output terminals and AC input terminals connected with said polyphase winding, a battery, means connecting said battery across the direct current output terminals of said bridge rectifier, a plurality of auxiliary diodes connected with said three-phase output winding, said auxiliary diodes and three diodes of bridge rectifier network providing direct current field energizing output terminals, a voltage regulating means including a field control device and first and second voltage responsive means coupled to said field control device, means connecting said field winding of said generator and said field control device across said field energizing direct current output terminals, means connecting said first voltage responsive means across said battery, and means connecting said second voltage responsive means across said field energizing direct current output terminals, said second voltage responsive means operative to regulate the operation of said field control device when the voltage applied to said first voltage responsive means is not sufficient to operate said first voltage responsive means.

6. An electrical system comprising, an alternating current generator having a polyphase output winding and a field winding, a bridge rectifier having direct current output terminals and AC input terminals connected with said polyphase winding, a battery, means connecting said battery across the direct current output terminals of said bridge rectifier, a plurality of auxiliary diodes connected with said output winding of said generator, said auxiliary diodes and certain of the diodes of said bridge rectifier network providing field energizing direct current output terminals, a voltage regulator including a transistor having emitter, collector and base electrodes, means connecting said field winding and the collector and emitter electrodes of said transistor in series across said field energizing direct current output terminals, a first voltage divider connected across said battery, a first voltage responsive control circuit including a first Zener diode coupling said first voltage divider network and the base of said transistor, said first voltage responsive control circuit operative to bias said transistor conductive when the output voltage of said generator is below a desired regulated value and operative to bias said transistor nonconductive when said output voltage exceeds said desired regulated value, and a second voltage responsive control circuit coupled to the base of said transistor and connected across said field energizing direct current output terminals, said second voltage responsive control circuit operative to control the conduction of said transistor when the output voltage of said generator exceeds said first desired regulated value by a predetermined amount.

7. A voltage regulator for regulating the output voltage of a generator having an output winding and field winding comprising, a field energizing circuit adapted to be connected across direct current terminals energized by said output winding, said field energizing circuit including the collector and emitter of a transistor, a first voltage divider adapted to be connected across other direct current terminals energized by said output winding, a first Zener diode connected with said first voltage divider and coupled to the base of said transistor, said first Zener diode controlling the conduction of said transistor, a second voltage divider connected across said field energizing circuit, and a second Zener diode connected with said second voltage divider and coupled to the base of said transistor, said second Zener diode controlling the conduction of said transistor when the voltage applied to said first Zener diode is not sufficient to break it down.

References Cited

UNITED STATES PATENTS

| | | | |
|---|---|---|---|
| 3,300,689 | 1/1967 | Beddoes | 317—31 X |
| 3,317,792 | 5/1967 | Sutherland | 317—31 |
| 3,332,006 | 7/1967 | Worrell et al. | 322—28 X |
| 3,369,170 | 2/1968 | Custer | 320—61 X |

JOHN F. COUCH, Primary Examiner

U.S. Cl. X.R.

317—31; 322—28